United States Patent [19]

Schrell et al.

[11] Patent Number: 5,770,110
[45] Date of Patent: Jun. 23, 1998

US005770110A

[54] UV-ACTIVE REGENERATED CELLULOSE FIBER

[75] Inventors: Andreas Schrell; Stefan Meier, both of Frankfurt, Germany

[73] Assignee: Hoechst Aktiengesellschaft, Germany

[21] Appl. No.: 736,358

[22] Filed: Oct. 23, 1996

[30] Foreign Application Priority Data

Oct. 23, 1995 [DE] Germany .................. 195 39 315.5

[51] Int. Cl.$^6$ .......................... D01F 10/10; C09K 11/02; C09K 11/08
[52] U.S. Cl. ............................ 252/301.36; 106/204.01
[58] Field of Search .................. 252/301.36; 106/204.01

[56] References Cited

U.S. PATENT DOCUMENTS

| 2,382,355 | 8/1945 | Warren, Jr. ............ 252/301.36 |
| 2,934,449 | 4/1960 | Jones .................... 106/204.01 |

FOREIGN PATENT DOCUMENTS 1-168911  7/1989  Japan .

OTHER PUBLICATIONS

Chemical Abstract citation 122:190705—Jiang et al, "Fluorescent Films of Regenerated Cellulose", Yingyong Huaxue, vol. 12(1), pp. 30–33, 1995.

*Primary Examiner*—Melissa Bonner
*Attorney, Agent, or Firm*—Connolly & Hutz

[57] ABSTRACT

UV-active regenerated cellulose fiber Luminescent regenerated cellulose fiber comprising one or more inorganic luminophors selected from the group consisting of the phosphates, tungstates, oxides, silicates and aluminates of the alkaline earth metals, of the subgroup elements or of the rare earths and the halides of the alkali and alkaline earth metals doped with one or more activators selected from the group consisting of $Mn^{2+}$, $Mn^{4+}$, $Sb^{3+}$, $Sn^{2+}$, $Pb^{2+}$, $Cu^+$, $Ag^+$ and the rare earths.

10 Claims, No Drawings

UV-ACTIVE REGENERATED CELLULOSE FIBER

The invention relates to the field of luminescent cellulose fibers. Regenerated cellulose is generally colored by dyeing with water-soluble dyes or vat dyes by the methods customary in textile dyeing for staples, yarns, wovens and knits. Coloring as part of the spinning process, by contrast, has hitherto only been possible with pigments, since these coloring species are insoluble in water or organic solvents and thus remain encapsulated in the viscose fiber during the subsequent washing processes (Chemiefaser-Textilindustrie, vol. 34/86 (1984) No. 6, 444).

To brighten regenerated cellulose fiber, substantive brighteners which absorb radiation within a broad UV range at about 250–360 nm and fluoresce in the visible region at about 420–440 nm are added to the wash baths downstream of the spinning process. If water-soluble brighteners are used, the finished fiber will show poor washfastness properties, so that the desired effect is only of limited duration. In addition, the lightfastness level has to be classed as inadequate. A further disadvantage of these organic UV-active compounds is their cost.

When UV-active pigments are encapsulated in the fiber, the result is frequently a fiber having the self-color of the active substances or else a fiber which appears very white to bluish white to the human eye.

Japanese Patent Publication 87-327866 describes the addition of yttrium oxysulfide, but this pigment has the disadvantage that it looses its luminescence during the grinding to particle sizes less than 1 $\mu$m, since the luminescence effect depends on the crystal structure of the compound. In addition, the sulfur moiety in the molecule is not sufficiently resistant to the acidic spinning process, the subsequent desulfurization processes and the oxidative processing steps which a viscose fiber routinely undergoes.

It is an object of the present invention to provide a process for producing a colorless regenerated cellulose fiber without the disadvantages described above. It is also desired to have a fiber material which will fluoresce only within a very narrow spectral range of about 10–20 nm. This object is surprisingly achieved by mixing certain inorganic luminophors into the viscose dope and then spinning it into an acidic spin bath.

The present invention accordingly provides luminescent regenerated cellulose fiber comprising one or more inorganic luminophors selected from the group consisting of the phosphates, oxides, tungstates, silicates and aluminates of the alkaline earth metals, of the subgroup elements or of the rare earths and the halides of the alkali and alkaline earth metals doped with one or more activators selected from the group consisting of $Mn^{2+}$, $Mn^{4+}$, $Sb^{3+}$, $Sn^{2+}$, $Pb^{2+}$, $Cu^+$, $Ag^+$ and the rare earths.

The term "inorganic luminophors" is to be understood as meaning synthetic inorganic crystalline compounds capable of luminescing in the ultraviolet, X-ray or visible spectrum following energy absorption. In this process, known as photoluminescence, the wavelength of the emission maximum is greater than that of the absorbed radiation.

In general, the ability to luminesce is acquired only by activation, i.e. through incorporation (doping) of small amounts of foreign ions (activators) in the crystal lattice of the inorganic compound (base material).

Particularly preferred inorganic luminophors are calcium phosphates, zinc silicates, strontium phosphates, alkaline earth metal silicates, silicates and aluminates of the rare earths, tungstates of the alkaline earth metals, zinc oxides and oxides of the rare earths.

Particularly preferred activators are $Eu^{2+}$, $Eu^{3+}$, $Sb^{3+}$, $Mn^{2+}$, $Ag^+$, $Cu^+$, $Sn^{2+}$ and $Tb^{3+}$.

Of particular interest are the following luminophor-activator combinations: zinc salts with $Mn^{2+}$, $Cu^+$ or $Ag^+$ as activators; barium magnesium aluminate, $Ba(Al,Mg)_{11}O_{19}:Eu^{2+}$; strontium aluminate, $SrAl_2O_4:Eu^{2+}$; yttrium oxide, $Y_2O_3:Eu^{3+}$; calcium halophosphate, $Ca_5(PO_4)_3(F,Cl):Sb^{3+}, Mn^{2+}$; strontium magnesium orthophosphate, $(Sr,Mg)_3(PO_4)_2:Sn^{2+}$; zinc silicate $Zn_2SiO_4:Mn^{2+}$; cerium magnesium aluminate, $Ce(Mg,Al)_{12}O_{19}:Tb^{3+}$.

It has been found that the activated base materials can be excited even after encapsulation in a cellulose matrix and act luminescingly on irradiation. This is especially surprising because most inorganic luminophors are acid-labile and it was not foreseeable that these compounds would survive the strongly acidic spinning process intact. The luminophors emit light in narrow wavelength ranges of the visible spectrum, of the near ultraviolet and of the infrared.

The preparation of luminophors and their doping with activators is well known and has been repeatedly described in the literature, for example in Ullmann, Lexikon der technischen Chemie, 4th edition, vol. 16, pages 180 ff. (1978).

Luminescent regenerated cellulose fiber of this invention includes the inorganic luminophor in an amount of advantageously 0.01 to 5% by weight, preferably 0.2 to 3% by weight, based on the cellulose content of the spinning dope prior to coagulation and shaping.

The inorganic luminophors advantageously have an average particle size of less than 1 $\mu$m, in particular 0.5 to 0.7 $\mu$m.

The present invention also provides a process for producing luminescent regenerated cellulose fiber, which comprises adding the activator-doped inorganic luminophor to the viscose dope and spinning fiber by the viscose spinning process, or adding the luminophor to a cellulose solution and spinning fiber from the solution, for example by the cupro process, the lyocell process or the process involving low degree of substitution cellulose ethers.

More particularly, the cellulose is dissolved in a suitable organic solvent, for example N-methylmorpholine oxide/water, the luminophor is added to the solution in dispersed form, and the dope is directly spun into fiber.

The luminophors of this invention are highly compatible with the viscose. They are added in an amount of 0.01 to 5% by weight, preferably 0.2 to 3% by weight, based on the cellulose content of the spinning dope, prior to coagulation and shaping.

The examples which follow illustrate the invention. Parts are by weight.

EXAMPLE 1

A commercial fiber-grade viscose having a cellulose content of 8.9%, an alkali content of 5% and a viscosity of 38 falling-ball seconds at 30° C. is admixed with an inorganic luminophor as follows: 4.48 parts of yttrium oxide doped with europium, particle size less than 1 $\mu$m, are dispersed in 10 parts of water and mixed with 436 parts of fiber-grade viscose. This premix is stirred into 2522 parts of fiber-grade viscose. After devolatilization, the spinning dope is spun by commercial viscose spinning processes into a sulfuric acid bath comprising sodium sulfate and zinc sulfate to form fiber, which is stretched in acidic baths, cut, washed, spin finished and dried. The fiber obtained, which has no self-color, has a red luminescence color on irradiation with light of wavelength 254 nm.

EXAMPLE 2

Example 1 is repeated to mix 3%, based on the cellulose mass in the viscose, of barium magnesium aluminate doped with europium into the spinning dope.

Further processing by the operations customary for fiber-grade viscoses gives a modified-viscose fiber which on irradiation with light of wavelength 254 nm shows a blue luminescence color without itself being colored.

EXAMPLE 3

Example 1 is repeated to mix 1% of cerium magnesium aluminate comprising terbium as activator into the spinning dope. Processing by the further customary operations affords a fiber which on irradiation with light of wavelength 254 nm luminesces with a green luminescence color.

EXAMPLES 4 to 6

Example 1 is repeated each time to mix in each time 2% of the below-mentioned luminophor:activator.

|  | Luminescence color: |
|---|---|
| 4. calcium halophosphate: $Sb^{3+}$ | light blue |
| 5. strontium magnesium orthophosphate: $Sn^{2+}$ | reddish orange |
| 6. zinc silicate: $Mn^{2+}$ | green. |

What is claimed is:

1. Luminescent regenerated cellulose fiber comprising one or more inorganic luminophors selected from the group consisting of the phosphates, tungstates, oxides, silicates and aluminates of the alkaline earth metals, of the subgroup elements or of the rare earths and the halides of the alkali and alkaline earth metals doped with one or more activators selected from the group consisting of $Mn^{2+}$, $Mn^{4+}$, $Sb^{2+}$, $Pb^{2+}$, $Cu^+$, $Ag^+$ and the rare earths, and wherein the inorganic luminophors have an average particle size of less than 1 μm.

2. The luminescent regenerated cellulose fiber of claim 1, wherein the inorganic luminophors have a host compound selected from calcium phosphates, zinc silicates, strontium phosphates, alkaline earth metal silicates, silicates and aluminates of the rare earths, tungstates of the alkaline earth metals, zinc oxides and oxides of the rare earths.

3. The luminescent regenerated cellulose fiber of claim 1, wherein the activators are $Eu^{2+}$, $Eu^{3+}$, $Sb^{3+}$, $Mn^{2+}$, $Ag^+$, $Cu^+$, $Sn^{2+}$ or $Tb^{3+}$.

4. The luminescent regenerated cellulose fiber of claim 1, wherein barium magnesium aluminate or strontium aluminate, each doped with $Eu^{2+}$; yttrium oxide doped with $Eu^{3+}$ zinc silicate, doped with $Mn^{2+}$ or $Sb^{3+}$; or strontium magnesium orthophosphate doped with $Sn^{2+}$0 is used.

5. The luminescent regenerated cellulose fiber of claim 1, wherein the inorganic luminophors are present in an amount of 0.01 to 5% by weight, based on the cellulose content of the spinning dope prior to coagulation and shaping.

6. The luminescent regenerated cellulose fiber of claim 1, wherein the inorganic luminophors are present in an amount of 0.2 to 3% by weight, based on the cellulose content of the spinning dope prior to coagulation and shaping.

7. The luminescent regenerated cellulose fiber of claim 1, wherein the inorganic luminophors have an average particle size of 0.5 to 0.7 μm.

8. Luminescent regenerated cellulose fiber containing 0.01 to 5% by weight, based on the cellulose content of the spinning dope prior to coagulation and shaping, one or more inorganic luminophor-activator combinations selected from the group consisting of barium magnesium aluminate or strontium aluminate, each doped with $Eu^{2+}$; yttrium oxide doped with $Eu^{3+}$; calcium halophosphate or zinc silicate, each doped with $Mn^{2+}$ or $Sb^{3+}$; strontium magnesium orthophosphate doped with $Sn^{2+}$; and cerium magnesium aluminate doped with $Tb^{3+}$; and wherein the inorganic luminophors have an average particle size of less than 1 μm.

9. The luminescent regenerated cellulose fiber of claim 8, wherein the inorganic luminophors are present in an amount of 0.2 to 3% by weight, based on the cellulose content of the spinning dope prior to coagulation and shaping.

10. The luminescent regenerated cellulose fiber of claim 8, wherein the inorganic luminophors have an average particle size of 0.5 to 0.7 μm.

* * * * *

UNITED STATES PATENT AND TRADEMARK OFFICE
CERTIFICATE OF CORRECTION

PATENT NO. : 5,770,110
DATED : June 23, 1998
INVENTOR(S) : Andreas Schrell et al.

It is certified that error appears in the above-identified patent and that said Letters Patent is hereby corrected as shown below:

Column 4, line 5 (claim 4, line 5), delete "0".

Signed and Sealed this

Twenty-second Day of September, 1998

Attest:

BRUCE LEHMAN

Attesting Officer

Commissioner of Patents and Trademarks